Aug. 24, 1965    W. JONES    3,202,131
ANCHORED ANIMAL FEEDING BOWL
Filed Nov. 8, 1963

INVENTOR
Wardwell Jones
BY
ATTORNEYS

United States Patent Office 3,202,131
Patented Aug. 24, 1965

3,202,131
ANCHORED ANIMAL FEEDING BOWL
Wardwell Jones, 5045 Lahoma, Dallas, Tex.
Filed Nov. 8, 1963, Ser. No. 322,367
6 Claims. (Cl. 119—61)

This invention relates to receptacles and more particularly to water and feed bowls for pets and the like.

An object of this invention is to provide a new and improved water and feed bowl for animals which is usable both indoors and outdoors.

Another object is to provide a bowl having a base provided with anti-skid or friction means for engaging a smooth surface, such as that of a floor, to hold the bowl against movement thereon and also having means for engaging the earth when in use outdoors to hold the bowl against movement thereon.

Still another object is to provide a bowl having a friction or anti-skid layer or coating on its base for frictionally engaging a smooth surface to resist movement of the bowl thereon and having prongs disposed in recesses in the base which are movable between retracted positions wherein they are disposed within the recesses and extended positions wherein they extend perpendicularly downwardly from the base for insertion into the earth when the bowl is used outdoors.

A further object is to provide a base having a pair of prongs, each pivotally mounted at one end adjacent the periphery of the bowl and biased inwardly toward a retracted position within a recess in the base of the bowl when moved outwardly therefrom to a position extending perpendicularly downwardly from the base.

Still another object is to provide a bowl wherein the prongs are moved pivotally to their retracted positions within the recesses upon the disengagement of the prongs from the ground by biasing means.

Additional objects and advantages of the invention will be readily apparent from the reading of the following description of a device constructed in accordance with the invention, and reference to the accompanying drawings thereof, wherein.

Figure 1:
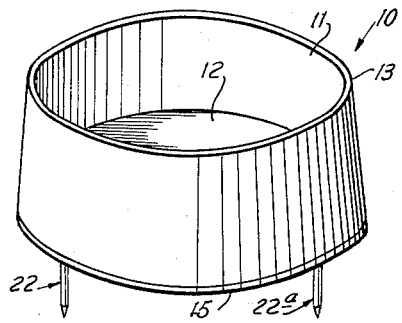
FIGURE 1 is a perspective view of a bowl embodying the invention showing the prongs in their extended positions.

Referring now to the drawings, the bowl 10 may be formed of any suitable substance such as plastic, wood, ceramic or the like. The bowl may be of any suitable configuration having an upwardly opening cavity 11 for holding water or food, the bowl including a base 12 and an annular wall 13 extending upwardly from the base. The bottom surface 14 of the base is flat or planar and a coat or layer 15 of a friction or anti-skid substance having a high coefficient of friction, such as rubber, plastic, and the like, is secured to the bottom surface in any suitable manner, as by an adhesive if the anti-skid substance is applied to the bottom surface in sheet form. If the adhesive is applied to the bottom surface in a liquid form, it of course bonds to the surface as it dries. If desired, the outer or bottom surface of the layer 15 may be corrugated or ribbed to increase the frictional force with which the bowl is held thereby against movement on a smooth surface, such as is provided by linoleum, tile or other covering of a floor F.

The base of the bowl has a pair of downwardly opening recesses 16 and 16a. The recess 16 has a substantially radially extending intermediate portion 17 and inner and outer end portions 18 and 19 on opposite ends of the intermediate end portions. The end portions of the recess are of greater depth than the intermediate portions.

A prong 22 is pivotally secured to the base for pivotal movement between a retracted position wherein it is wholly disposed within the recess 16 and does not have any portions thereof protruding therefrom, and an extended position where it extends perpendicularly downwardly from the base.

The prong has a shank 23 which extends through the intermediate portion of the recess and an end pivot portion 24 extending perpendicularly from the shank which is disposed in the outer end portion of the recess. The pivot portion is held rotatably in the outer end portion of the recess by a bracket 25 whose intermediate arcuate section 26 receives the pivot portion and whose planar end tabs or arms 27 are secured to the base in any suitable menner, as by the screws 28. The end of the pivot portion of the prong may have an enlarged head or external flange 29 which is engageable with one side edge of the bracket 25 to limit its lateral movement in one direction within the outer end portion of the recess. Its movement in the opposite direction is limited by the engagement of the end surface of the pivot portion with the surface 20 defining an end of the outer end portion of the recess.

The prong 22 is biased toward the retracted position wherein it is disposed within the recess 16 by a coil spring 31 disposed about the pivot portion. One end 33 of the spring is received in a recess 34 of the base and its other end is formed into a hook portion 35 which engages the shank of the prong.

The recess 16a and the prong 22a are of the same configuration and structure as the recess 16 and the prong 22, and accordingly, various portions and elements thereof have been provided with the same reference numerals, to which the subscript "a" has been added, as the corresponding portions or elements of the recess 16 and the prong 22.

The layer or coat 15 is provided with openings on apertures 35a which register with the base recesses 16 and 16a. The base layer 15 preferably closes the outer end portions 19 and 19a of the recesses and conceals from view the pivot portion of each prong and its mounting and biasing means. The shanks 23 and 23a of the prongs bear against the arcuate surfaces defining the intermediate portions of the recesses in which they are disposed and are thus held in positions parallel to the bottom surface of the base and wholly within their recesses when the prongs are held therein by their springs.

It will now be seen that the prongs 22 and 22a are pivotable about parallel axes at locations adjacent the periphery of the bowl and spaced diametrically of the base of the bowl so that the prongs are spaced from one another and the central axis when in their extended positions and that the free pointed ends of the shanks extend into the inner end portions 18 and 18a of the recess 16 and 16a, respectively, so that fingers may be inserted into the inner end portions to engage the free ends of the shanks and pivot the prongs toward their extended positions against the forces exerted thereon by the biasing springs.

In use, when the bowl is to be positioned on a smooth surface, such as that provided by a floor F, the prongs are left in their retracted positions in the base recesses and are held therein by their biasing springs so that the friction coat or layer 15 engages the smooth surface of the floor covering and tends to prevent sliding movement of the bowl on the floor due to forces which may be imparted to the bowl by the animal drinking water or eating food held in the cavity 11 of the bowl.

Figure 2:
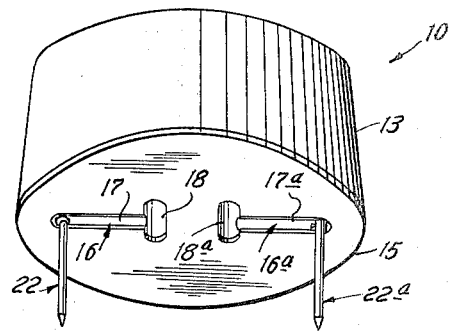
FIGURE 2 is another perspective view of the bowl showing the prongs in their extended positions.
Figure 3:
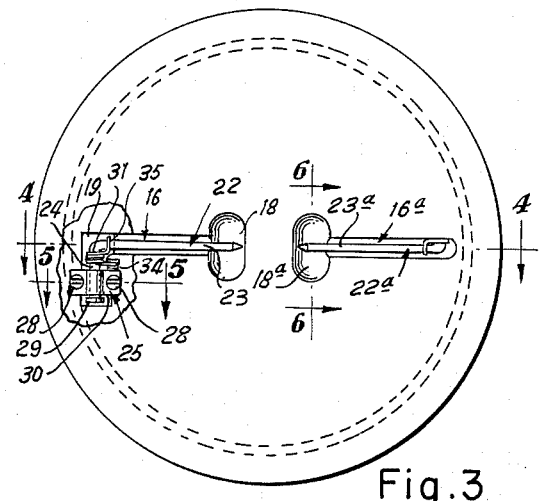
FIGURE 3 is a plan view of the bottom of the bowl, with some parts broken away, showing the prongs in their retracted positions within the recesses in the base of the bowl.
Figure 5:
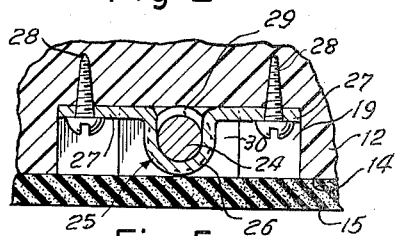
FIGURE 5 is an enlarged sectional view taken on line 5—5 of FIGURE 3.
Figure 6:
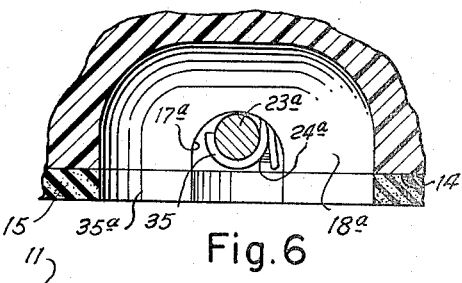
FIGURE 6 is an enlarged sectional view taken on line 6—6 of FIGURE 5.
Figure 4:
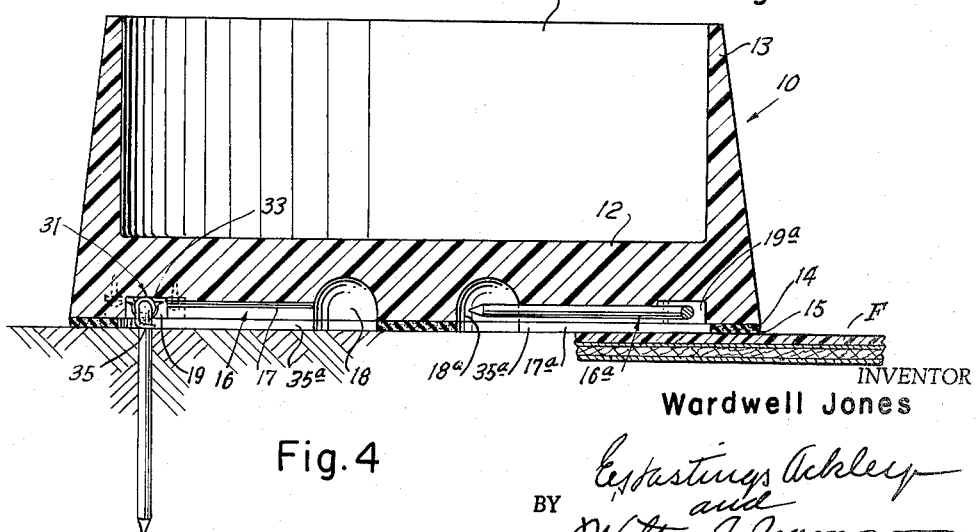
FIGURE 4 is a sectional view taken on line 4—4 of FIGURE 3 showing one prong in its extended position inserted in the earth and the other prong in its retracted position assumed thereby when the bowl is placed on a floor.

When the bowl is used outdoors and placed on a rough surface, such as grass, earth or the like, the friction layer is less effective in preventing such sliding movement of the bowl. In this case, the prongs are moved to their fully extended positions illustrated in FIGURES 1 and 2 by inserting fingers into the inner end portions of the recesses of the base to engage the outer ends of the prongs which are then easily moved against the forces exerted by the biasing springs to their perpendicular positions relative to the base. The bowl is then moved downwardly until its base rests on the earth, the prongs penetrating into the earth during such downward movement. The prongs then resist any movement of the bowl on the ground since they are spaced from each other and are embedded in the earth. When the bowl is subsequently lifted from the ground, the prongs are automatically moved to their retracted positions by the biasing springs and do not protrude from the base so that the bowl may be easily placed on a planar surface such as that provided by a floor or a shelf.

It will now be seen that a new and improved water and feed bowl for pets and the like has been illustrated and described which has a substantially planar base provided with a pair of recesses and having prong means movably secured thereto for movement between retracted positions wherein the prongs are disposed in the recesses and extended positions wherein the prongs extend perpendicularly downwardly from the base.

It will further be seen that the two prongs are pivotally mounted at diametrically spaced locations adjacent the periphery of the base and that they are movable inwardly and upwardly from the periphery of the base toward their retracted positions.

It will further be seen that the recesses are provided with inner enlarged portions extending perpendicularly of the radial portions thereof whereby the free ends of the prongs are easily engageable by fingers inserted into the inner end portions of the recesses.

It will further be seen that the prongs do not interfere with the storage, packaging or transportation of the bowl since they are moved automatically and are held in their inner retracted positions within the recesses of the base of the bowl by biasing spring.

It will also be apparent that while the two prongs have been shown mounted in individual recesses in order to provide a maximum area of contact of the layer 15 with a floor, the bottom prongs could be mounted within a single diametrically extending recess of the base.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A bowl including: a base; means extending upwardly from said base and defining with the said base an upwardly opening cavity, said base having downwardly opening recess means below said cavity; and a pair of prongs, said prongs being secured to said base for pivotal movement between retracted positions within said recess means and extended positions wherein said prongs extend perpendicularly downwardly from said base, said prongs being spaced from one another when in their extended positions, said base having a bottom surface provided with friction means engageable with a smooth surface on which the bowl is placed for frictionally resisting sliding movement of the bowl on the smooth surface.

2. A bowl including: a base; means extending upwardly from said base and defining with the said base a cavity, said base having downwardly opening recess means; and a pair of prongs, said prongs being secured to said base for pivotal movement between retracted positions within said recess means and extended positions wherein said prongs extend perpendicularly downwardly from said base, said prongs being spaced from one another when in their extended positions; and biasing means operatively associated with said prongs for biasing said prongs toward said retracted positions, said base having a bottom surface provided with friction means engageable with a smooth surface on which the bowl is placed for frictionally resisting sliding movement of the bowl on the smooth surface.

3. A bowl including: a base; means extending upwardly from said base and providing with the base an upwardly opening cavity, said base having a substantially planar bottom surface, said base having a pair of radially extending downwardly opening recesses below said cavity and prongs pivotally secured to said base for movement between retracted positions wherein said prongs are disposed within said recesses and extended positions wherein said prongs extend perpendicularly downwardly from said base, said prongs being spaced from one another when in their extended positions, the axes of pivotal movement of said prongs being parallel and diametrically spaced relative to a central axis of said base, said axes being located adjacent the periphery of said base, whereby said prongs are diametrically spaced when in their extended positions.

4. A bowl including: a base; means extending upwardly from said base and providing with the base a cavity, said base having a substantially planar bottom surface, said base having a pair of radially extending recesses; and prongs pivotally secured to said base for movement between retracted positions wherein said prongs are disposed within said recesses and extended positions wherein said prongs extend perpendicularly downwardly from said base, said prongs being spaced from one another when in their extended positions, each of said recesses having an intermediate radial portion and outer and inner end portions of greater depth than said intermediate portion extending perpendicularly relative to said intermediate portion, each of said prongs having an angular pivot portion disposed in said outer end portion of said recess and having its free end disposed in said inner end portion when said prong is in its retracted position.

5. A bowl including: a base; means extending upwardly from said base and providing with the base a cavity, said base having a substantially planar bottom surface, said base having a pair of radially extending recesses; and prongs pivotally secured to said base for movement between retracted positions wherein said prongs are disposed within said recesses and extended positions wherein said prongs extend perpendicularly downwardly from said base, said prongs being spaced from one another when in their extended positions, the axes of pivotal movement of said prongs being parallel and diametrically spaced relative to a central axis of said base, said axes being located adjacent the periphery of said base, whereby said prongs are diametrically spaced when in their extended positions, each of said recesses having an intermediate radial portion and outer and inner end portions of greater depth than said intermediate portion extending perpendicularly relative to said intermediate portion, each of said prongs having an angular pivot portion disposed in said outer end portion of said recess and having its free end disposed in said inner end portion when said prong is in its retracted position.

6. A bowl including: a base, means extending upwardly from said base and providing with the base a cavity, said base having a substantially planar bottom surface, said base having a pair of radially extending recesses; and prongs pivotally secured to said base for movement between retracted positions wherein said prongs are disposed within said recesses and an extended position wherein said prongs extend perpendicularly downwardly from said base, said prongs being spaced from one another when in their extended positions, each of said recesses having an intermediate radial portion and outer and inner end portions of greater depth than said intermediate portion extending perpendicularly relative to said intermediate portion, each of said prongs having an angular pivot portion disposed in said outer end portion of said recess and a shank whose free end is disposed in said inner end portion when said prong is in its retracted position, said biasing means comprising a coil spring disposed about said pivot portion and having opposite end portions bearing against the shank of the prong.

References Cited by the Examiner

UNITED STATES PATENTS

| | | | |
|---|---|---|---|
| 648,263 | 4/00 | Hull | 239—276 |
| 1,244,357 | 10/17 | Moore | 248—156 |
| 2,542,400 | 2/51 | Donofrio | 119—61 X |
| 2,681,164 | 6/54 | Kalfen | 220—18 |
| 2,772,660 | 12/56 | Saul | 119—61 |
| 2,778,365 | 1/57 | Silverman et al. | 131—235 |
| 2,813,509 | 11/57 | Bruno | 119—51 |
| 2,857,957 | 10/58 | Gay | 248—156 X |
| 2,903,190 | 9/59 | Le Deit | 239—276 |

SAMUEL KOREN, *Primary Examiner.*

ALDRICH F. MEDBERY, *Examiner.*